US012726285B2

(12) United States Patent
Huang et al.

(10) Patent No.: US 12,726,285 B2
(45) Date of Patent: Sep. 1, 2026

(54) SIDELINK REFERENCE SIGNAL SEARCH

(71) Applicant: QUALCOMM Incorporated, San Diego, CA (US)

(72) Inventors: Chu-Hsiang Huang, San Diego, CA (US); Tien Viet Nguyen, Bridgewater, NJ (US); Qing Li, Princeton Junction, NJ (US); Kapil Gulati, Belle Mead, NJ (US); Gideon Shlomo Kutz, Ramat Hasharon (IL); Gabi Sarkis, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 18/045,670

(22) Filed: Oct. 11, 2022

(65) Prior Publication Data

US 2023/0130337 A1 Apr. 27, 2023

Related U.S. Application Data

(60) Provisional application No. 63/267,766, filed on Feb. 9, 2022, provisional application No. 63/262,835, filed on Oct. 21, 2021.

(51) Int. Cl.
*H04B 17/318* (2015.01)
*H04W 24/10* (2009.01)

(52) U.S. Cl.
CPC .......... *H04B 17/328* (2023.05); *H04W 24/10* (2013.01)

(58) Field of Classification Search
CPC .... H04B 17/318; H04W 24/10; H04W 76/14; H04W 76/28
See application file for complete search history.

(56) References Cited

U.S. PATENT DOCUMENTS

2015/0024760 A1 * 1/2015 Zheng .................. H04W 48/16 455/444
2019/0090293 A1 * 3/2019 Su ......................... H04W 76/14
2020/0037358 A1 * 1/2020 Chae ................ H04W 74/0808
2020/0245275 A1 7/2020 Thangarasa et al.
(Continued)

FOREIGN PATENT DOCUMENTS

WO WO-2018031166 A1 * 2/2018 ........ H04W 56/0015

OTHER PUBLICATIONS

International Search Report and Written Opinion—PCT/US2022/077942—ISA/EPO—Jan. 31, 2023.
(Continued)

*Primary Examiner* — Charles C Jiang
*Assistant Examiner* — Ryan C Kavleski
(74) *Attorney, Agent, or Firm* — Harrity & Harrity, LLP

(57) ABSTRACT

Various aspects of the present disclosure generally relate to wireless communication. In some aspects, a user equipment (UE) may determine, periodically, at least one metric associated with a current reference signal on a sidelink. Accordingly, the UE may extend a time window allowed for a search for a new reference signal on the sidelink based at least in part on the at least one metric. For example, the UE may extend the time window as a function of a discontinuous reception cycle associated with the UE. Alternatively, the UE may extend the time window for a preconfigured amount of time. Numerous other aspects are described.

30 Claims, 6 Drawing Sheets

(56) References Cited

U.S. PATENT DOCUMENTS

| | | | | |
|---|---|---|---|---|
| 2021/0037468 | A1* | 2/2021 | Huang | H04W 72/044 |
| 2021/0144681 | A1* | 5/2021 | Gulati | H04W 72/02 |
| 2022/0039035 | A1* | 2/2022 | Chen | H04L 5/0048 |

OTHER PUBLICATIONS

ETSI TS 138 133, "5G, NR, Requirements for Support of Radio Resource Management (3GPP TS 38.133 version 17.6.0 Release 17)", V17.6.0, Sep. 2022, 3348 pages.

Ericsson: "Resource Allocation Mechanisms for Power Saving", 3GPP Draft, 3GPP TSG-RAN WG1 Meeting #104-e, R1-2100687, 3rd Generation Partnership Project, Mobile Competence Centre, 650, Route Des Lucioles, F06921 Sophia-Antipolis Cedex, France, No. e-Meeting, Jan. 26, 2021-Feb. 5, 2021, Jan. 18, 2021, XP051970461, 16 pages.

* cited by examiner

400
UE
120a
UE
120b
405
Current SL reference signal
410a
Determine metric(s) associated with current SL reference signal
410b
Exchange data
415
Extend time window allowed for search for new reference signal

500

SIDELINK REFERENCE SIGNAL SEARCH

CROSS-REFERENCE TO RELATED APPLICATIONS

This Patent Application claims priority to U.S. Provisional Patent Application No. 63/262,835, filed on Oct. 21, 2021, entitled "SIDELINK REFERENCE SIGNAL SEARCH," and assigned to the assignee hereof, and to U.S. Provisional Patent Application No. 63/267,766, filed on Feb. 9, 2022, entitled "SIDELINK REFERENCE SIGNAL SEARCH," and assigned to the assignee hereof. The disclosures of the prior Applications are considered part of and are incorporated by reference in this Patent Application.

FIELD OF THE DISCLOSURE

Aspects of the present disclosure generally relate to wireless communication and to techniques and apparatuses for performing a sidelink reference signal search.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining, periodically, at least one metric associated with a current reference signal on a sidelink. The method may further include extending a time window allowed for a search for a new reference signal on the sidelink based at least in part on the at least one metric.

Some aspects described herein relate to an apparatus for wireless communication at a UE. The apparatus may include a memory and one or more processors coupled to the memory. The one or more processors may be configured to determine, periodically, at least one metric associated with a current reference signal on a sidelink. The one or more processors may be further configured to extend a time window allowed for a search for a new reference signal on the sidelink based at least in part on the at least one metric.

Some aspects described herein relate to a non-transitory computer-readable medium that stores a set of instructions for wireless communication by a UE. The set of instructions, when executed by one or more processors of the UE, may cause the UE to determine, periodically, at least one metric associated with a current reference signal on a sidelink. The set of instructions, when executed by one or more processors of the UE, may further cause the UE to extend a time window allowed for a search for a new reference signal on the sidelink based at least in part on the at least one metric.

Some aspects described herein relate to an apparatus for wireless communication. The apparatus may include means for determining, periodically, at least one metric associated with a current reference signal on a sidelink. The apparatus may further include means for extending a time window allowed for a search for a new reference signal on the sidelink based at least in part on the at least one metric.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
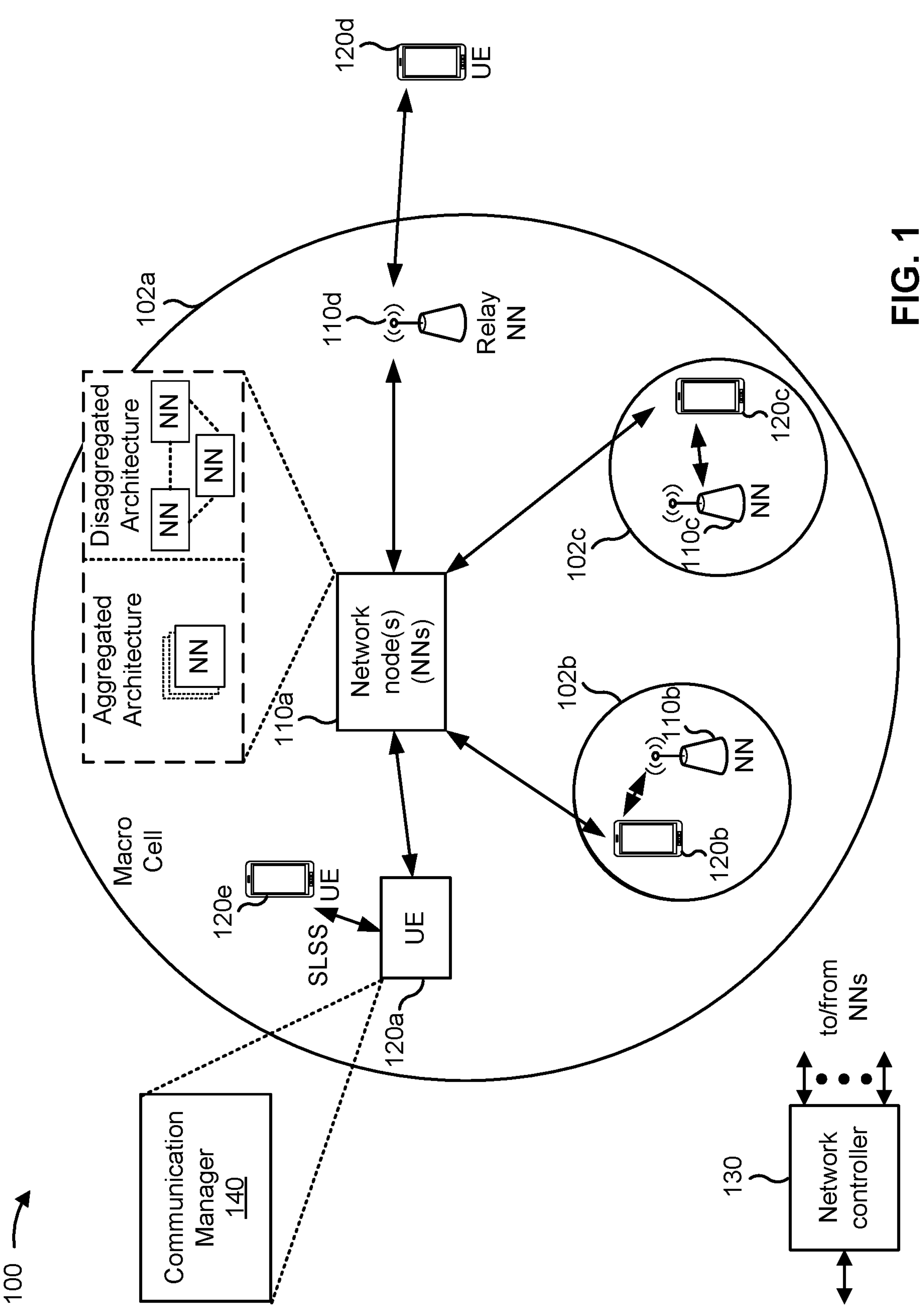
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

The UE 120*e* may use global navigation satellite system (GNSS) timing to synchronize sidelink communications. However, when the UE 120*e* is unable to synchronize to GNSS, to a reference signal (e.g., from a network, such as a primary cell (PCell) of the wireless network 100), or to another reference signal that is synchronized to GNSS, the UE 120*e* may broadcast a sidelink synchronization signal (SLSS) (e.g., according to 3GPP specifications), as shown in FIG. 1. Accordingly, other UEs (e.g., the UE 120*a* as shown in FIG. 1) may use the SLSS to synchronize sidelink communications.

In some aspects, the UE 120 may include a communication manager 140. As described in more detail elsewhere herein, the communication manager 140 may determine, periodically, at least one metric associated with a current reference signal on a sidelink and may extend a time window allowed for a search for a new reference signal on the sidelink based at least in part on the at least one metric. Additionally, or alternatively, the communication manager 140 may perform one or more other operations described herein.

As indicated above, FIG. 1 is provided as an example. Other examples may differ from what is described with regard to FIG. 1.

Figure 2:
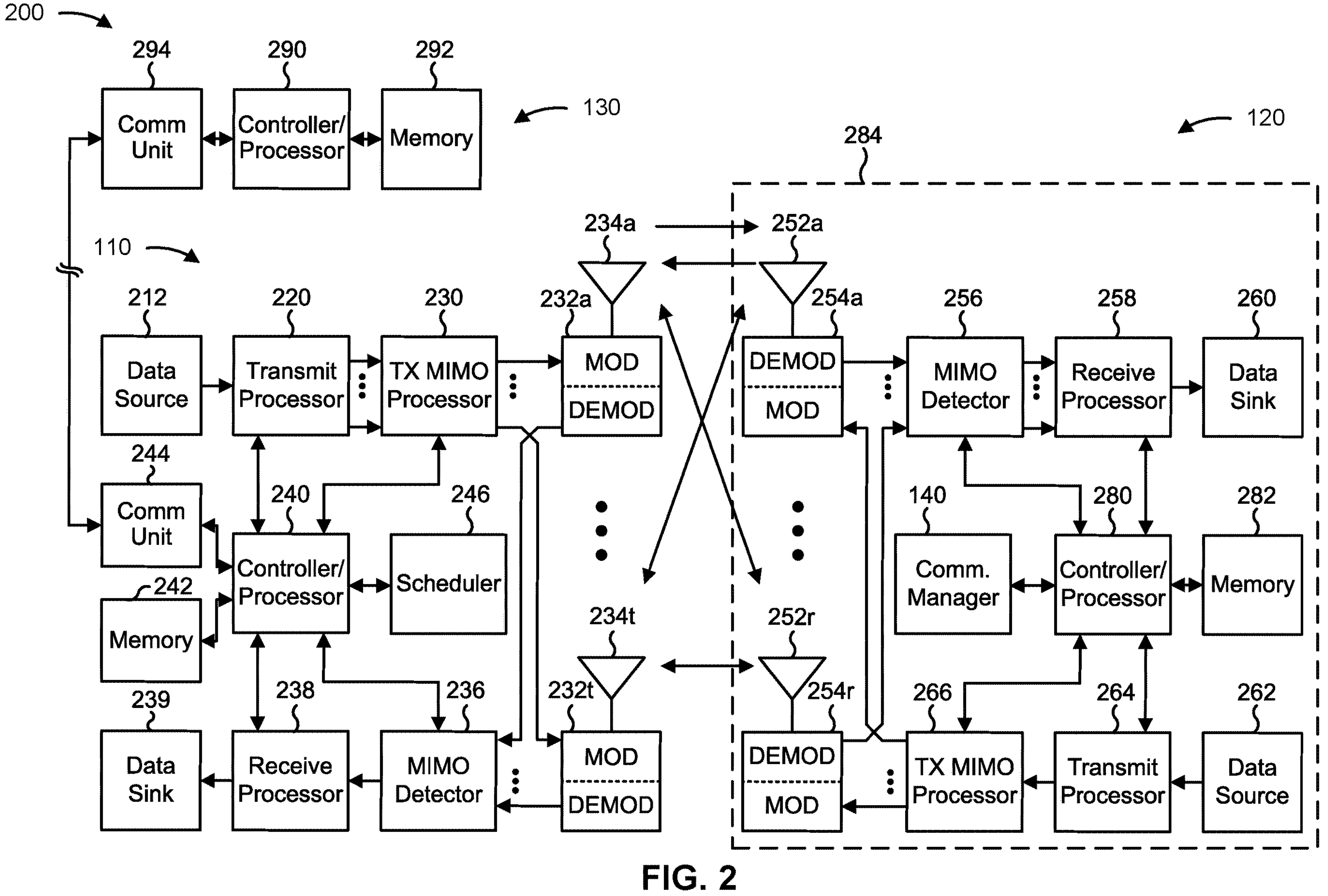
FIG. 2 is a diagram illustrating an example of a base station in communication with a user equipment in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term “controller/processor” may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the network node 110, the controller/processor 280 of the UE 120, and/or any other component(s) of FIG. 2 may perform one or more techniques associated with performing a sidelink reference signal search, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 600 of FIG. 6) may include means for determining, periodically, at least one metric associated with a current reference signal on a sidelink and/or means for extending a time window allowed for a search for a new reference signal on the sidelink based at least in part on the at least one metric. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
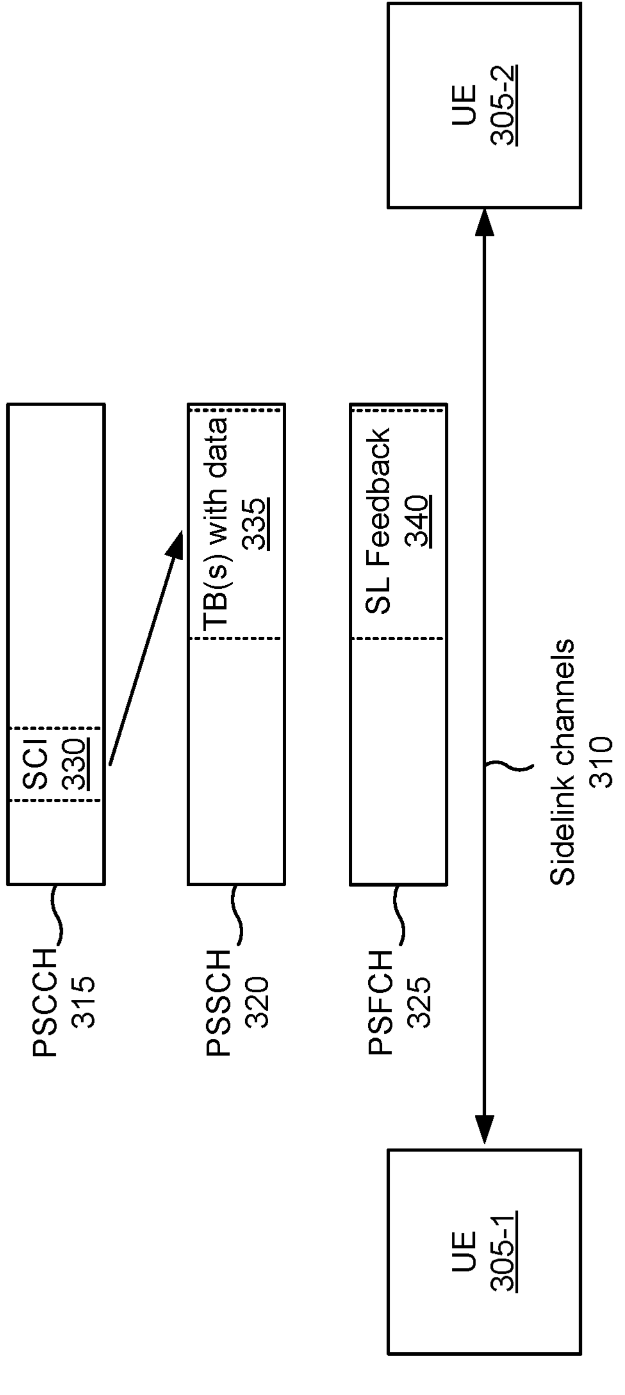
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using GNSS timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described above, the UE 305 may use GNSS to synchronize sidelink communications. However, when the UE 305 is unable to synchronize to GNSS, to a reference signal (e.g., from a network, such as a PCell of the network), or to another reference signal that is synchronized to GNSS, the UE 305 may broadcast an SLSS (e.g., according to 3GPP specifications). Accordingly, other UEs may use the SLSS to synchronize sidelink communications.

Whenever a UE is not directly or indirectly synchronized to GNSS and is operating on a sidelink with GNSS configured as a highest priority synchronization source or a serving cell (and/or a PCell) is configured as the highest priority synchronization source, the UE generally performs a SyncRef UE search (e.g., as described in 3GPP specifications) to try and find a strong SLSS to use for synchronization. However, each SyncRef UE search consumes power and processing resources at the UE. Additionally, because the UE is not aware of the SLSS timing when searching for an SLSS from a new source UE, the UE usually monitors for a full 480 millisecond (ms) window. According to 3GPP specifications, the UE performs this search within an 8 second time window (e.g., with a periodicity of 8 seconds), also referred to as a "detection time requirement." Accordingly, this search is sometimes referred to as an "asynchronous SyncRef UE search." The large window for the search results in latency and can lead to packet losses of up to 6%, which in turn wastes more power, processing resources, and network resources for retransmissions. Asynchronous SyncRef UE search also prevents UE from saving power by entering a low-power mode associated with a discontinuous reception (DRx) cycle.

Some techniques and apparatuses described herein enable a UE (e.g., UE 120) to extend a time window allowed for a search for a new reference signal on a sidelink when at least one metric associated with a current reference signal on the sidelink satisfies one or more conditions. As a result, the UE 120 conserves power and processing resources by performing searches less frequently (e.g., less frequent asynchronous SyncRef UE searches) and may conserve additional power by entering a low-power mode associated with a DRx cycle. In some aspects, the UE 120 may skip a search altogether (e.g., by extending the time window to infinity). Accordingly, the UE 120 reduces latency associated with a window for the skipped search, which in turn conserves more power, processing resources, and network resources that would otherwise have been used for retransmissions.

As indicated above, FIG. 3 is provided as an example. Other examples may differ from what is described with respect to FIG. 3.

Figure 4:
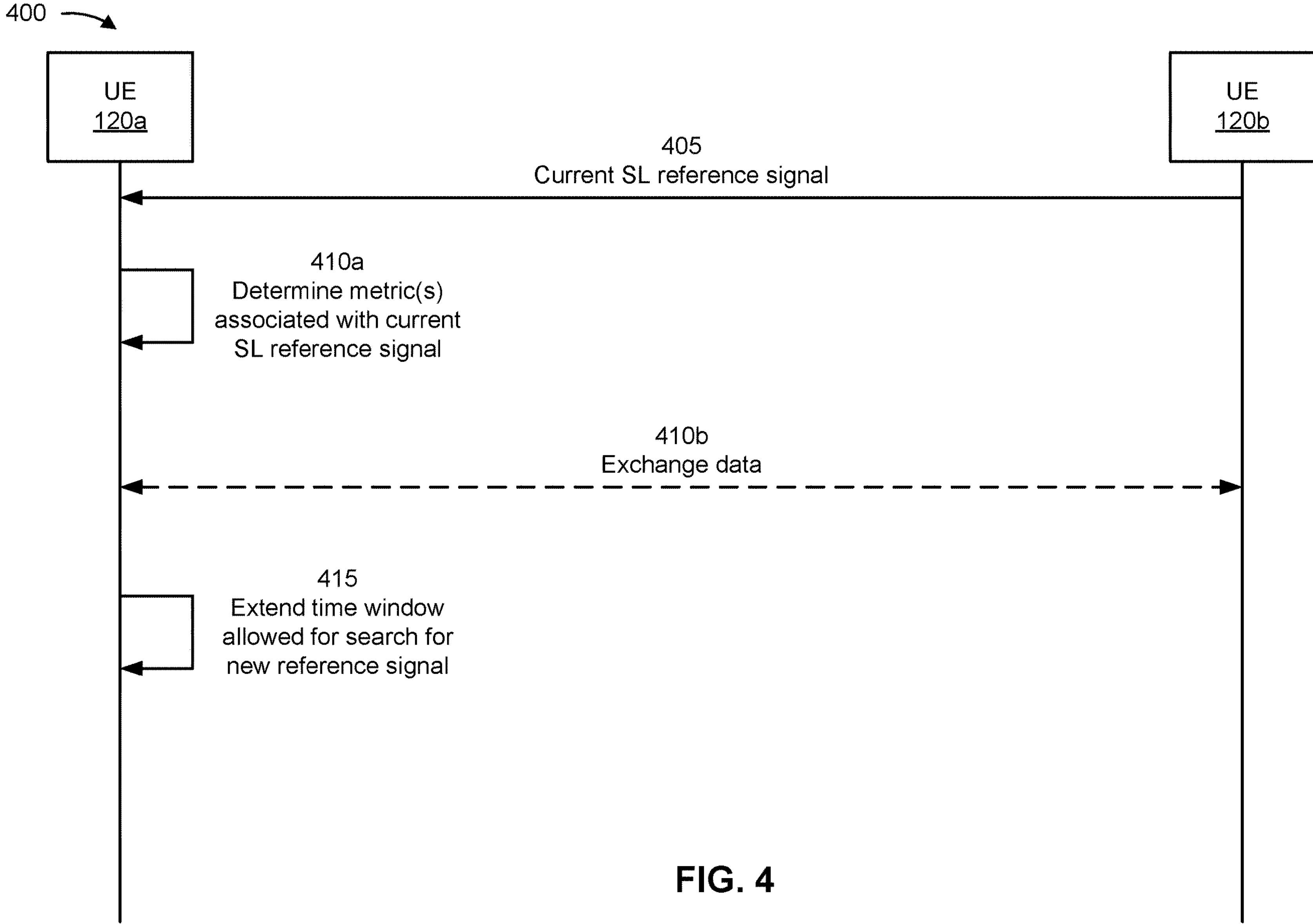
FIG. 4 is a diagram illustrating an example associated with performing a sidelink reference signal search, in accordance with the present disclosure.

FIG. 4 is a diagram illustrating an example 400 associated with performing a sidelink reference signal search, in accordance with the present disclosure. As shown in FIG. 4, a plurality of UEs (e.g., UE 120*a*, UE 120*b*, and/or additional UEs) may communicate with one another (e.g., on a sidelink, as described in connection with FIG. 3).

As shown by reference number 405, the UE 120*b* may transmit, and the UE 120*a* may receive, a current reference signal on the sidelink. For example, the UE 120*b* may transmit an SLSS (e.g., which may be synchronized to GNSS or not). Accordingly, the UE 120*a* may use the UE 120*b* as a source UE such that the UE 120*a* performs sidelink communication using timing based on the SLSS.

As shown by reference number 410*a*, the UE 120*a* may determine at least one metric associated with the current reference signal. The at least one metric may include an RSRP (and/or another quantification of signal strength) associated with the current reference signal, an RSRP variation associated with the current reference signal, an RSRP trend associated with the current reference signal, and/or an RSRQ (and/or another quantification of signal quality) associated with the current reference signal.

The UE 120*a* may calculate variation using one of a plurality of formulas, such as an average value of the square of a most recent RSRP measurement minus a current filtered RSRP value (e.g., represented as (instantaneous RSRP—current filtered RSRP)$^2$), an average value of the square of a previous filtered RSRP value minus a current filtered RSRP value (e.g., represented as (previous filtered RSRP—current filtered RSRP)$^2$), and/or another formula. The formula may be programmed (and/or otherwise preconfigured) into the UE 120*a* (e.g., according to 3GPP specifications and/or another standard) and/or may be selected by the UE 120*a*. In a combinatory example, the UE 120*a* may select the formula from a plurality of possible formulas that are programmed (and/or otherwise preconfigured) into the UE 120*a*. To determine the filtered RSRP values, the UE 120 may similarly use a programmed (and/or otherwise preconfigured) filter (e.g., according to 3GPP specifications and/or another standard) and/or a filter selected by the UE 120*a*. In a combinatory example, the UE 120*a* may select the filter from a plurality of possible filters that are programmed (and/or otherwise preconfigured) into the UE 120*a*.

The UE 120*a* may determine the trend as a current slope associated with change in the RSRP (e.g., as a difference between a most recent RSRP measurement and a current filtered RSRP value) and/or using hysteresis based on one or more previous RSRP values.

In some aspects, the UE 120*a* may determine the at least one metric periodically. For example, the UE 120*a* may determine the metric(s) once every x ms, where x represents the period. The period may be programmed (and/or otherwise preconfigured) into the UE 120*a* (e.g., according to 3GPP specifications and/or another standard) and/or may be selected by the UE 120*a*. In a combinatory example, the UE 120*a* may select the period from a plurality of possible periods that are programmed (and/or otherwise preconfigured) into the UE 120*a*. The period may be represented by $T_{evaluate,SLSS}$ as defined in 3GPP specifications.

Additionally, or alternatively, and as shown by reference number 410*b*, the UE 120*a* may maintain a data connection with the UE 120*b*. For example, the UE 120*a* may transmit data and/or other signals to the UE 120*b* that are received (and successfully decoded) by the UE 120*b* (e.g., as determined by the UE 120*a* based on HARQ feedback, CSI reports, and/or other confirmation from the UE 120*b*). Additionally, or alternatively, the UE 120*a* may receive (and may also successfully decode) data and/or other signals from the UE 120*b*.

Accordingly, as shown by reference number 415, the UE 120*a* may extend a time window allowed for a search for a new reference signal on the sidelink (e.g., represented by $T_{detect,SyncRefUE\_V2X}$ as defined in 3GPP specifications) based at least in part on the at least one metric. For example, the UE 120*a* may extend the time window allowed for an asynchronous SyncRef UE search and/or from a SyncRef UE search without knowing SLSS timing. As a result, the UE 120*a* conserves power and processing resources. Additionally, in some aspects, the UE 120*a* may enter a low-power mode (e.g., a mode in which one or more hardware and/or software components of the UE 120*a* are powered down) during time that would otherwise have been occupied by the search.

In some aspects, the UE 120*a* may extend the time window according to a preconfigured amount of time. For example, the UE 120*a* may be programmed (and/or otherwise preconfigured) with a time window of 8 seconds for the search (e.g., according to 3GPP specifications) and may extend the time window by 1 second, 2 seconds, and/or another amount of time programmed (and/or otherwise preconfigured) into the UE 120*a* (e.g., according to updated 3GPP specifications).

Alternatively, the UE 120*a* may extend the time window as a function of a DRx cycle associated with the UE 120*a*. As a result, the UE 120*a* may extend the time window for a longer amount of time when the DRx cycle is longer because the relative power and processing resources consumed by the search are greater when the DRx cycle is longer. In one example, the UE 120*a* may extend the time window by an amount of time that is a multiple of a DRx cycle length. For example, the UE 120*a* may be programmed (and/or otherwise preconfigured) with a scaling factor (e.g., an integer multiplier or a fractional multiplier) such that the UE 120*a* extends the time window to the product of the scaling factor and the DRx cycle length (e.g., to x*y, where x represents the scaling factor, and y represents the DRx cycle length). In some aspects, the UE 120*a* may select from a maximum of the product and a default length of the time window, which may be 8 seconds as described above (e.g., by applying the function max(x*y, 8) in seconds). As a result, for shorter DRx cycles and smaller scaling factors, the UE 120*a* may maintain the time window at the default length because the relative power and processing resources consumed by the search are less when the DRx cycle is shorter.

As an alternative, the UE 120*a* may refrain from performing the search (e.g., by extending the time window to infinity). As a result, the UE 120 reduces latency associated with time that would otherwise have been occupied by the search, which in turn conserves more power, processing resources, and network resources that would otherwise have been used for retransmissions.

In some aspects, the UE 120*a* may extend the time window when the RSRP (and/or another measure of signal strength) associated with the current reference signal satisfies an RSRP threshold. For example, when a current SLSS is strong enough, the UE 120*a* may extend the time window allowed for searching for a new SLSS.

Additionally, or alternatively, the UE 120*a* may extend the time window when the RSRP variation (and/or a variation of another measure of signal strength) associated with the current reference signal satisfies a variation threshold. For example, when a current SLSS is not varying significantly, the UE 120*a* may extend the time window allowed for searching for a new SLSS.

Additionally, or alternatively, the UE 120*a* may extend the time window when the RSRQ (and/or another measure of signal quality) associated with the current reference signal satisfies an RSRQ threshold. For example, when a current SLSS has a high enough quality, the UE 120*a* may extend the time window allowed for searching for a new SLSS.

Additionally, or alternatively, the UE 120*a* may extend the time window when a direction of the RSRP trend (and/or a trend of another measure of signal strength) associated with the current reference signal satisfies a trend threshold. For example, when a current SLSS is increasing in strength, the UE 120*a* may extend the time window allowed for searching for a new SLSS. In another example, when a current SLSS is increasing and/or decreasing in strength by a small amount (e.g., according to the trend threshold), the 120*a* may extend the time window allowed for searching for a new SLSS.

Additionally, or alternatively, the UE 120*a* may extend the time window based at least in part on a data connection with the UE 120*b* (e.g., as described in connection with reference number 410*b*). In a combinatory example, the UE 120*a* may extend the time window when one or more thresholds described above are satisfied and the data connection with the UE 120*b* is maintained.

By using techniques as described in connection with FIG. 4, the UE 120*a* extends the time window allowed for a search for a new reference signal on the sidelink. As a result, the UE 120*a* conserves power and processing resources by performing less frequent searches (e.g., less frequent asynchronous SyncRef UE searches).

As indicated above, FIG. 4 is provided as an example. Other examples may differ from what is described with respect to FIG. 4.

Figure 5:
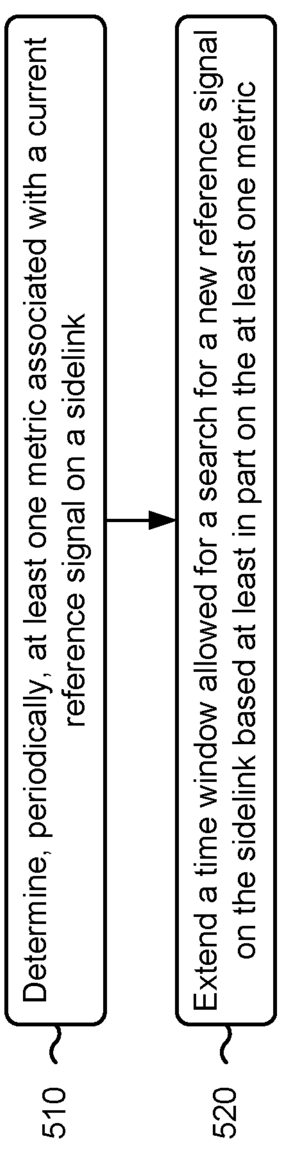
FIG. 5 is a diagram illustrating an example process associated with performing a sidelink reference signal search, in accordance with the present disclosure.

FIG. 5 is a diagram illustrating an example process 500 performed, for example, by a UE, in accordance with the present disclosure. Example process 500 is an example where the UE (e.g., UE 120 and/or apparatus 600 of FIG. 6) performs operations associated with sidelink reference signal search.

As shown in FIG. 5, in some aspects, process 500 may include determining, periodically, at least one metric associated with a current reference signal on a sidelink (block 510). For example, the UE (e.g., using communication manager 140 and/or determination component 608, depicted in FIG. 6) may determine, periodically, at least one metric associated with a current reference signal on a sidelink, as described herein.

As further shown in FIG. 5, in some aspects, process 500 may include extending a time window allowed for a search for a new reference signal on the sidelink based at least in part on the at least one metric (block 520). For example, the UE (e.g., using communication manager 140 and/or search component 610, depicted in FIG. 6) may extend a time window allowed for a search for a new reference signal on the sidelink based at least in part on the at least one metric, as described herein.

Process 500 may include additional aspects, such as any single aspect or any combination of aspects described below and/or in connection with one or more other processes described elsewhere herein.

In a first aspect, the time window is extended as a function of a DRx cycle associated with the UE.

In a second aspect, alone or in combination with the first aspect, the time window is extended for a preconfigured amount of time.

In a third aspect, alone or in combination with one or more of the first and second aspects, extending the time window includes refraining from performing the search.

In a fourth aspect, alone or in combination with one or more of the first through third aspects, the at least one metric comprises an RSRP associated with the current reference signal, an RSRP variation associated with the current reference signal, an RSRP trend associated with the current reference signal, an RSRQ associated with the current reference signal, or a combination thereof.

In a fifth aspect, alone or in combination with one or more of the first through fourth aspects, extending the time window includes extending the time window based on the RSRP associated with the current reference signal satisfying an RSRP threshold, the RSRP variation associated with the current reference signal satisfying a variation threshold, the RSRQ associated with the current reference signal satisfying an RSRQ threshold, a direction of the RSRP trend associated with the current reference signal satisfying a trend threshold, or a combination thereof.

Figure 6:
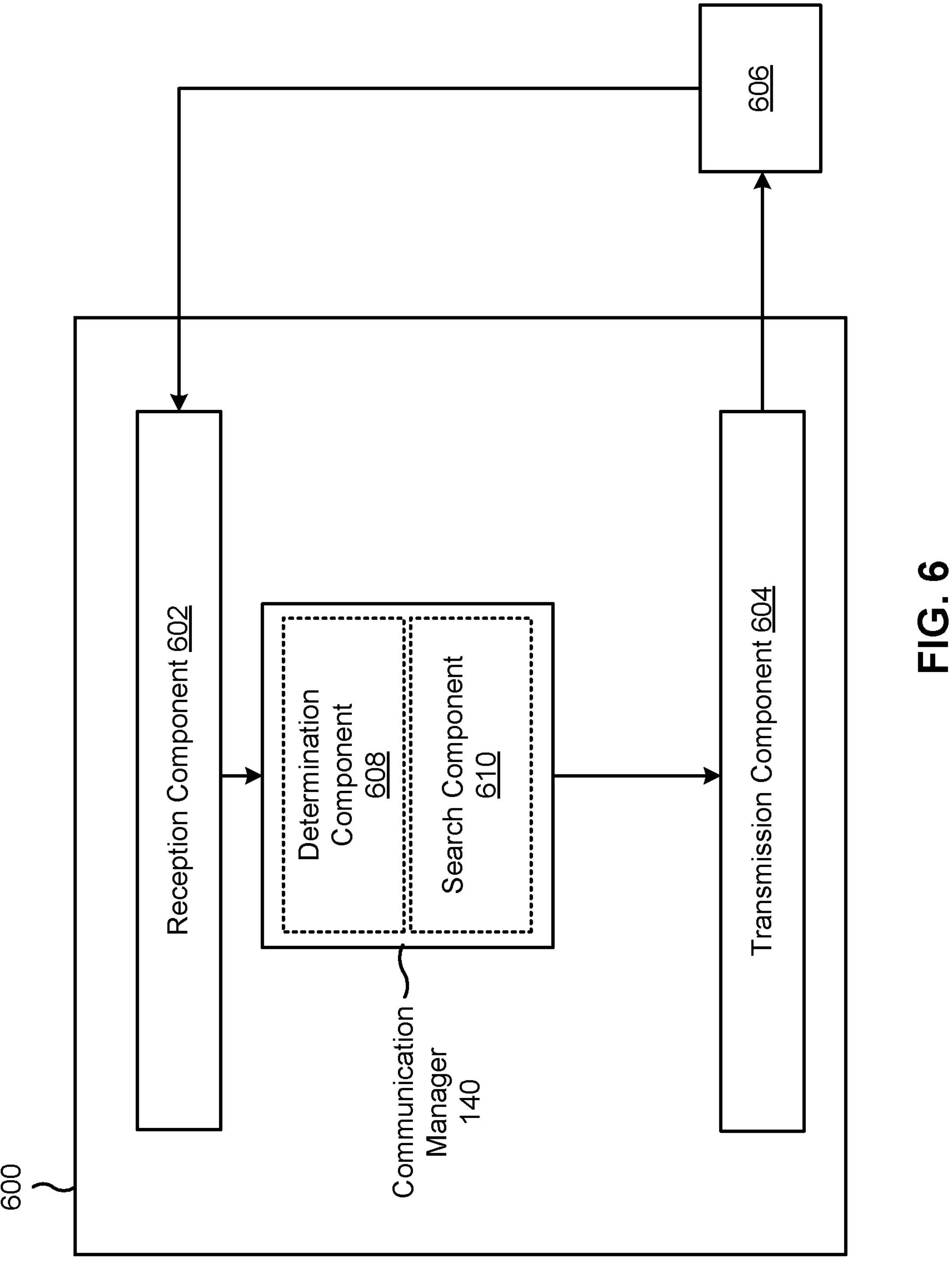
FIG. 6 is a diagram of an example apparatus for wireless communication, in accordance with the present disclosure.

In a sixth aspect, alone or in combination with one or more of the first through fifth aspects, process 500 further includes transmitting (e.g., using communication manager 140 and/or transmission component 604, depicted in FIG. 6) to a source UE associated with the current reference signal, where extending the time window includes extending the time window based at least in part on a data connection with the source UE.

In a seventh aspect, alone or in combination with one or more of the first through sixth aspects, process 500 further includes receiving (e.g., using communication manager 140 and/or reception component 602, depicted in FIG. 6) from a source UE associated with the current reference signal, where extending the time window includes extending the time window based at least in part on a data connection with the source UE.

In an eighth aspect, alone or in combination with one or more of the first through seventh aspects, the current reference signal includes an SLSS.

In a ninth aspect, alone or in combination with one or more of the first through eighth aspects, the search includes an asynchronous SyncRef UE search or a SyncRef UE search without SLSS timing awareness.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, an RU, or another wireless communication device) using the reception component 602 and the transmission component 604. As further shown, the apparatus 600 may include the communication manager 140. The communication manager 140 may include one or more of a determination component 608 and/or a search component 610, among other examples.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5, or a combination thereof. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

In some aspects, the determination component 608 may determine, periodically, at least one metric associated with a current reference signal on a sidelink. The determination component 608 may include one or more antennas, a modem, a demodulator, a MIMO detector, a receive processor, a controller/processor, a memory, or a combination thereof, of the UE described in connection with FIG. 2. Accordingly, the search component 610 may extend a time window allowed for a search for a new reference signal on the sidelink based at least in part on the at least one metric. The search component 610 may include one or more antennas, a modem, a demodulator, a MIMO detector, a receive processor, a controller/processor, a memory, or a combination thereof, of the UE described in connection with FIG. 2.

In some aspects, the transmission component 604 may transmit (e.g., to a source UE, such as apparatus 606) associated with the current reference signal. Accordingly, the search component 610 may extend the time window based at least in part on a data connection with the source UE. Additionally, or alternatively, the reception component 602 may receive (e.g., from a source UE, such as apparatus 606) associated with the current reference signal. Accordingly, the search component 610 may extend the time window based at least in part on a data connection with the source UE.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a user equipment (UE), comprising: determining, periodically, at least one metric associated with a current reference signal on a sidelink; and extending a time window allowed for a search for a new reference signal on the sidelink based at least in part on the at least one metric.

Aspect 2: The method of Aspect 1, wherein the time window is extended as a function of a discontinuous reception (DRx) cycle associated with the UE.

Aspect 3: The method of Aspect 1, wherein the time window is extended for a preconfigured amount of time.

Aspect 4: The method of Aspect 1, wherein extending the time window comprises refraining from performing the search.

Aspect 5: The method of any of Aspects 1 through 4, wherein the at least one metric comprises a reference signal received power (RSRP) associated with the current reference signal, an RSRP variation associated with the current reference signal, an RSRP trend associated with the current reference signal, a reference signal received quality (RSRQ) associated with the current reference signal, or a combination thereof.

Aspect 6: The method of Aspect 5, wherein extending the time window comprises extending the time window based on: the RSRP associated with the current reference signal satisfying an RSRP threshold; the RSRP variation associated with the current reference signal satisfying a variation threshold; the RSRQ associated with the current reference signal satisfying an RSRQ threshold; a direction of the RSRP trend associated with the current reference signal satisfying a trend threshold; or a combination thereof.

Aspect 7: The method of any of Aspects 1 through 6, further comprising: transmitting to a source UE associated with the current reference signal, wherein extending the time window comprises extending the time window based at least in part on a data connection with the source UE.

Aspect 8: The method of any of Aspects 1 through 7, further comprising: receiving from a source UE associated with the current reference signal, wherein extending the time window comprises extending the time window based at least in part on a data connection with the source UE.

Aspect 9: The method of any of Aspects 1 through 8, wherein the current reference signal comprises a sidelink synchronization signal (SLSS).

Aspect 10: The method of any of Aspects 1 through 9, wherein the search comprises an asynchronous SyncRef UE search or a SyncRef UE search without SLSS timing awareness.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and one or more processors, coupled to the memory, configured to:

determine, periodically, at least one metric associated with a current sidelink synchronization signal (SLSS) on a sidelink, the at least one metric comprising a reference signal received power (RSRP) trend associated with the current SLSS; and extend a time window allowed for a search for a new SLSS on the sidelink based at least in part on the at least one metric, wherein the time window is extended based at least in part on a direction of the RSRP trend associated with the current SLSS satisfying a trend threshold.

2. The apparatus of claim 1, wherein the time window is extended as a function of a discontinuous reception (DRx) cycle associated with the UE.

3. The apparatus of claim 1, wherein the time window is extended for a preconfigured amount of time.

4. The apparatus of claim 1, wherein the at least one metric comprises a reference signal received power (RSRP) associated with the current SLSS, an RSRP variation associated with the current SLSS, a reference signal received quality (RSRQ) associated with the current SLSS, or a combination thereof.

5. The apparatus of claim 4, wherein the one or more processors, to extend the time window, are configured to extend the time window based on: the RSRP associated with the current SLSS satisfying an RSRP threshold; the RSRP variation associated with the current SLSS satisfying a variation threshold; the RSRQ associated with the current SLSS satisfying an RSRQ threshold; or a combination thereof.

6. The apparatus of claim 1, wherein the one or more processors are further configured to:

transmit to a source UE associated with the current SLSS, wherein the one or more processors, to extend the time window, are configured to extend the time window based at least in part on a data connection with the source UE.

7. The apparatus of claim 1, wherein the one or more processors are further configured to:

receive from a source UE associated with the current SLSS, wherein the one or more processors, to extend the time window, are configured to extend the time window based at least in part on a data connection with the source UE.

8. The apparatus of claim 1, wherein the search comprises an asynchronous SyncRef UE search or a SyncRef UE search without SLSS timing awareness.

9. A method of wireless communication performed by a user equipment (UE), comprising:

determining, periodically, at least one metric associated with a current sidelink synchronization signal (SLSS) on a sidelink, the at least one metric comprising a reference signal received power (RSRP) trend associated with the current SLSS; and extending a time window allowed for a search for a new SLSS on the sidelink based at least in part on the at least one metric, wherein the time window is extended based at least in part on a direction of the RSRP trend associated with the current SLSS satisfying a trend threshold.

10. The method of claim 9, wherein the time window is extended as a function of a discontinuous reception (DRx) cycle associated with the UE.

11. The method of claim 9, wherein the time window is extended for a preconfigured amount of time.

12. The method of claim 9, wherein the at least one metric comprises a reference signal received power (RSRP) associated with the current SLSS, an RSRP variation associated with the current SLSS, a reference signal received quality (RSRQ) associated with the current SLSS, or a combination thereof.

13. The method of claim 12, wherein extending the time window comprises extending the time window based on: the RSRP associated with the current SLSS satisfying an RSRP threshold; the RSRP variation associated with the current SLSS satisfying a variation threshold; the RSRQ associated with the current SLSS satisfying an RSRQ threshold; or a combination thereof.

14. The method of claim 9, further comprising:

transmitting to a source UE associated with the current SLSS, wherein extending the time window comprises extending the time window based at least in part on a data connection with the source UE.

15. The method of claim 9, further comprising:

receiving from a source UE associated with the current SLSS, wherein extending the time window comprises extending the time window based at least in part on a data connection with the source UE.

16. The method of claim 9, wherein the search comprises an asynchronous SyncRef UE search or a SyncRef UE search without SLSS timing awareness.

17. A non-transitory computer-readable medium storing a set of instructions for wireless communication, the set of instructions comprising:

one or more instructions that, when executed by one or more processors of a user equipment (UE), cause the UE to:

determine, periodically, at least one metric associated with a current sidelink synchronization signal (SLSS) on a sidelink, the at least one metric comprising a reference signal received power (RSRP) trend associated with the current SLSS; and extend a time window allowed for a search for a new SLSS on the sidelink based at least in part on the at least one metric, wherein the time window is extended based at least in part on a direction of the RSRP trend associated with the current SLSS satisfying a trend threshold.

18. The non-transitory computer-readable medium of claim 17, wherein the time window is extended as a function of a discontinuous reception (DRx) cycle associated with the UE.

19. The non-transitory computer-readable medium of claim 17, wherein the at least one metric comprises a reference signal received power (RSRP) associated with the current SLSS, an RSRP variation associated with the current SLSS, a reference signal received quality (RSRQ) associated with the current SLSS, or a combination thereof.

20. The non-transitory computer-readable medium of claim 19, wherein the one or more instructions, that cause the UE to extend the time window, cause the UE to extend the time window based on: the RSRP associated with the current SLSS satisfying an RSRP threshold; the RSRP variation associated with the current SLSS satisfying a variation threshold; the RSRQ associated with the current SLSS satisfying an RSRQthreshold; or a combination thereof.

21. The non-transitory computer-readable medium of claim 17, wherein the one or more instructions further cause the UE to:

transmit to a source UE associated with the current SLSS, wherein the one or more instructions, that cause the UE to extend the time window, cause the UE to extend the time window based at least in part on a data connection with the source UE.

22. The non-transitory computer-readable medium of claim 17, wherein the one or more instructions further cause the UE to:

receive from a source UE associated with the current SLSS, wherein the one or more instructions, that cause the UE to extend the time window, cause the UE to extend the time window based at least in part on a data connection with the source UE.

23. The non-transitory computer-readable medium of claim 17, wherein the search comprises an asynchronous SyncRef UE search or a SyncRef UE search without SLSS timing awareness.

24. An apparatus for wireless communication, comprising:

means for determining, periodically, at least one metric associated with a current sidelink synchronization signal (SLSS) on a sidelink, the at least one metric comprising a reference signal received power (RSRP) trend associated with the current SLSS; and means for extending a time window allowed for a search for a new SLSS on the sidelink based at least in part on the at least one metric, wherein the time window is extended based at least in part on a direction of the RSRP trend associated with the current SLSS satisfying a trend threshold.

25. The apparatus of claim 24, wherein the time window is extended as a function of a discontinuous reception (DRx) cycle associated with a user equipment (UE).

26. The apparatus of claim 24, wherein the time window is extended for a preconfigured amount of time.

27. The apparatus of claim 24, wherein the at least one metric comprises a reference signal received power (RSRP) associated with the current SLSS, an RSRP variation associated with the current SLSS, a reference signal received quality (RSRQ) associated with the current SLSS, or a combination thereof.

28. The apparatus of claim 1, wherein the UE is not synchronized to global navigation satellite system.

29. The apparatus of claim 1, wherein the new SLSS is synchronized to global navigation satellite system.

30. The method of claim 9, wherein the UE is not synchronized to global navigation satellite system.

* * * * *